United States Patent
Choi

(10) Patent No.: US 8,805,331 B2
(45) Date of Patent: Aug. 12, 2014

(54) METHOD FOR BRIEFING A SCHEDULE IN A MOBILE COMMUNICATION TERMINAL

(75) Inventor: Yun-Shil Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/898,073

(22) Filed: Jul. 22, 2004

(65) Prior Publication Data

US 2005/0020314 A1    Jan. 27, 2005

(30) Foreign Application Priority Data

Jul. 25, 2003  (KR) ......................... 10-2003-0051524

(51) Int. Cl.
*H04M 1/663* (2006.01)
*H04M 1/725* (2006.01)

(52) U.S. Cl.
USPC .................. 455/412.2; 455/412.1; 455/414.1; 455/418; 455/563; 455/556.2; 455/566; 455/567

(58) Field of Classification Search
USPC ............. 455/412.1, 412.2, 414.1, 414.2, 563, 455/566, 567, 556.2, 550.1, 466, 418; 709/217, 219
See application file for complete search history.

(56) References Cited

U.S. PATENT DOCUMENTS

| | | | |
|---|---|---|---|
| 4,769,796 A * | 9/1988 | Levine | 368/29 |
| 5,767,778 A * | 6/1998 | Stone et al. | 340/636.1 |
| 6,208,996 B1 * | 3/2001 | Ben-Shachar et al. | 707/104.1 |
| 6,484,033 B2 * | 11/2002 | Murray | 455/456.3 |
| 6,925,603 B1 * | 8/2005 | Naito et al. | 715/733 |
| 6,928,300 B1 * | 8/2005 | Skinner et al. | 455/556.2 |
| 6,957,397 B1 * | 10/2005 | Hawkins et al. | 715/856 |
| 6,993,497 B2 * | 1/2006 | Yeh et al. | 705/14.66 |
| 7,043,278 B2 * | 5/2006 | Valade et al. | 455/567 |
| 7,047,038 B1 * | 5/2006 | Macor | 455/556.1 |
| 7,242,925 B2 * | 7/2007 | O'Neil et al. | 455/414.1 |
| 7,421,390 B2 * | 9/2008 | Simpson | 704/270 |
| 2002/0034969 A1 * | 3/2002 | Sundstrom | 455/566 |
| 2002/0131564 A1 | 9/2002 | Wu | |
| 2002/0132645 A1 * | 9/2002 | Sprigg | 455/566 |
| 2002/0137552 A1 * | 9/2002 | Cannon et al. | 455/567 |
| 2003/0114189 A1 * | 6/2003 | Moon | 455/556 |
| 2003/0206199 A1 * | 11/2003 | Pusa et al. | 345/794 |
| 2004/0034709 A1 * | 2/2004 | Lee | 709/228 |
| 2004/0064567 A1 * | 4/2004 | Doss et al. | 709/228 |
| 2004/0230685 A1 * | 11/2004 | Seligmann | 709/228 |

FOREIGN PATENT DOCUMENTS

| | | |
|---|---|---|
| GB | 2308938 | 7/1997 |
| JP | 2003030113 | 1/2003 |

* cited by examiner

*Primary Examiner* — Olumide T Ajibade Akonai
(74) *Attorney, Agent, or Firm* — Lee, Hong, Degerman, Kang & Waimey

(57) ABSTRACT

There is provided a schedule briefing method of a mobile communication terminal having a user schedule management function. The steps of this method include a step for initiating a schedule briefing, a step for determining whether a schedule exists for a predetermined period of time, a step for audibly outputting content of the schedule, and a step for terminating the briefing. The schedule is outputted in a vocal format to allow a hands-free review of a user's schedule.

17 Claims, 3 Drawing Sheets

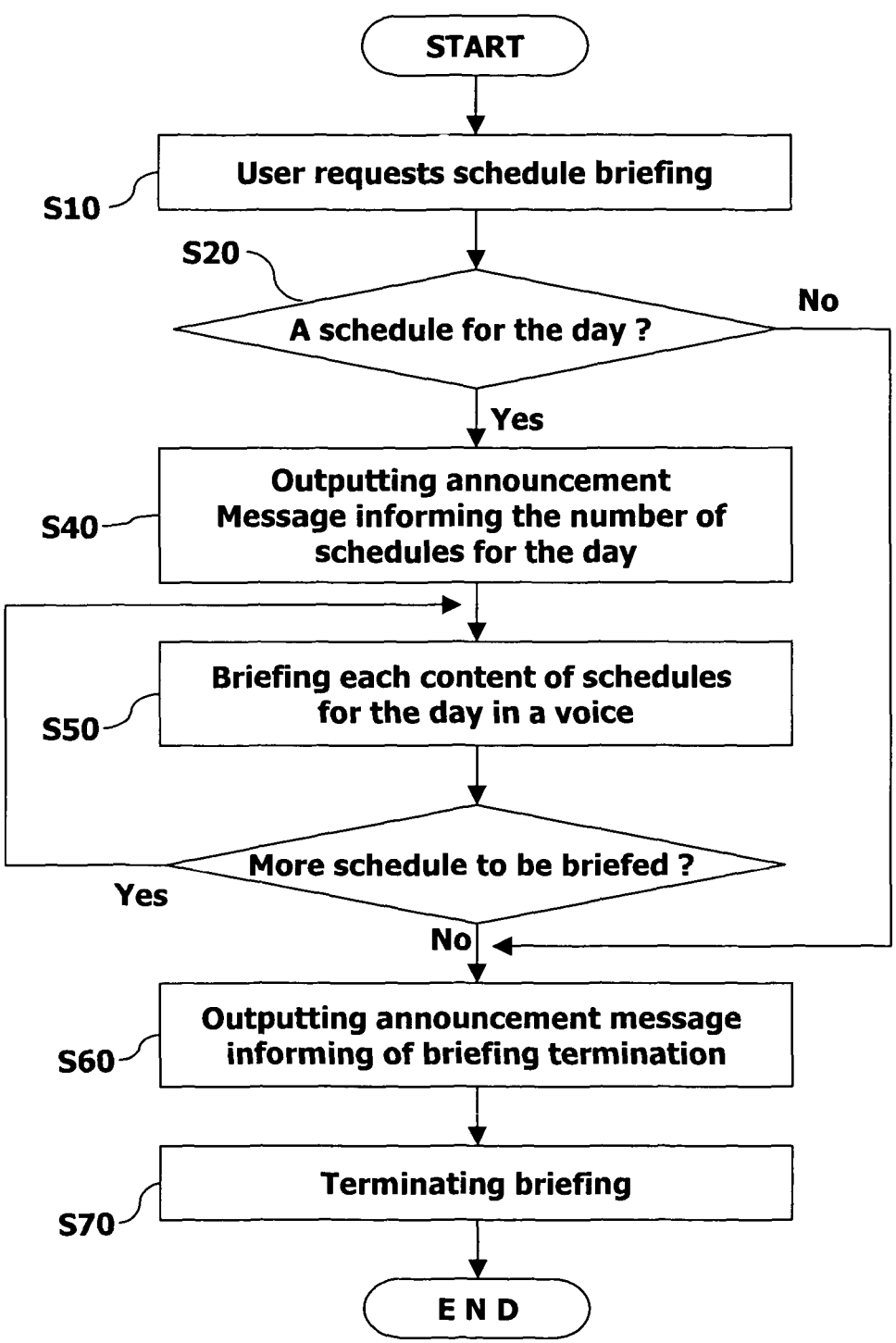

METHOD FOR BRIEFING A SCHEDULE IN A MOBILE COMMUNICATION TERMINAL

CROSS REFERENCE TO RELATED APPLICATIONS

Pursuant to 35 U.S.C. § 119(a), this application claims the benefit of earlier filing date and right of priority to the Korean Patent Application No. 2003-51524, filed on Jul. 25, 2003, the content of which is hereby incorporated by reference in its entirety

BACKGROUND OF THE INVENTION

1. Field of the Invention

The present invention relates to a mobile communication terminal and, more particularly, to a schedule management function of a mobile communication terminal.

2. Description of the Background Art

In general, mobile communication terminals, such as cellular telephones, personal data assistants (PDA's) and the like, include a supplementary function, among others, of managing a user's schedule. Through a schedule management function, important schedules or events, such as anniversaries, appointments, and agendas, can be stored in the mobile communication terminal. Additionally, the function also may serve to inform the user of a scheduled event at a predetermined time or on demand. Often, such schedule management functions are carried out by an "organizer" or "scheduler" installed in the mobile communication terminal.

With reference to FIG. 1, a method for managing a schedule in a mobile communication terminal, in accordance with the related art, will be described as follows.

When a new schedule is added or a content of a previously stored schedule is intended to be changed, the user switches a screen of the mobile terminal to a menu mode by manipulating the mobile communication terminal, such as by pressing a menu function key. Thereafter, the user accesses an organizer menu item by further manipulation of the terminal, such as by pressing a cursor shift button (▲, ▼) or a menu select button, which in turn initiates and drives the scheduler.

For example, as the scheduler is driven, a calendar as shown in FIG. 1 appears. The user may add a new schedule, or correct or delete a previous schedule by moving a date select cursor to a desired date on the calendar. In adding the new schedule (e.g., an appointment), the user can select an "addition" item of the menu and input an appointment time and correspondingly detailed content. After the content of the schedule is completely inputted, the user can press, for example, an "end" button to stop the operation of the scheduler and revert the screen and mode of the mobile communication terminal to a basic set mode.

Thereafter, when the appointment date and time arrive, the organizer or scheduler alerts the user via initiating an alarm (e.g., sound an alarm, creating a vibration, or blinking a light) and outputs the content of the appointment on the screen. When the user checks the schedule, the user may then optionally remove the content of the schedule from the screen.

The above-described schedule managing function is disadvantageous in that since the schedule content is outputted as a text, the only mode of receiving or confirming a schedule is visual. Additionally, if the user's hands are occupied, such as when driving a car or eating, use of the schedule management function of his mobile communication terminal to retrieve a schedule is not very convenient or practical.

SUMMARY OF THE INVENTION

Therefore, an object of the present invention is to provide a schedule briefing method of a mobile communication terminal capable of audibly outputting a schedule.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve at least the above objects in whole or in parts, there is provided a schedule briefing method of a mobile communication terminal having a user schedule management function, the method comprising the steps of: initiating a schedule briefing; determining whether a schedule exists for a predetermined period of time; audibly outputting content of the schedule; and terminating the briefing.

According to one aspect of the present invention, the schedule briefing is initiated via manipulation of a smart key disposed on the terminal. Furthermore, the content of the schedule is vocally outputted by a text to speech (TTS) function, wherein the content of the schedule may be vocally outputted in the form of a voice selected from a group consisting of a male, a female, mechanical, and one or more celebrities. Also, the user may select a tone of the voice.

According to another aspect of the present invention, the briefing may be terminated if no schedule exists for the predetermined period of time and the step of terminating the briefing is audibly announced. Also, the method may further comprise the step of audibly announcing a number of events scheduled for the predetermined period of time.

According to another aspect of the present invention, the method may further comprise the step of audibly outputting supplementary information selected by the user. The supplementary information may be provided by a communication service provider. Finally, the supplementary information may be audibly outputted in a mechanical voice.

It is to be understood that both the foregoing general description and the following detailed description are exemplary and explanatory and are intended to further describe the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention. In the drawings:

FIG. 4 illustrates a flow chart of a schedule briefing method in accordance with an embodiment of the present invention.

Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

A schedule briefing method of a mobile communication terminal, in accordance to an embodiment of the present invention, refers to a method for audibly outputting a user's schedule, preferably in voice. Furthermore, the method is preferably initiated by the user manipulating the terminal in a single action, such as depressing one key or engaging one device on the terminal. For example, a "smart key," which may be one of plurality of terminal manipulation devices disposed on the mobile communication terminal, may be specially programmed for initiating and operating the schedule briefing method.

When the user's manipulation of a programmed smart key is sensed, a scheduler, which may comprise a plurality of functions including a schedule management function, installed in the mobile communication terminal outputs a user's schedule for a predetermined period. For example, the user may desire to be informed of all events schedule for an entire day or for two hours.

The mobile communication terminal of the present invention also comprises a TTS (Text to Speech) function, which converts text data to audible speech data.

Figure 1:
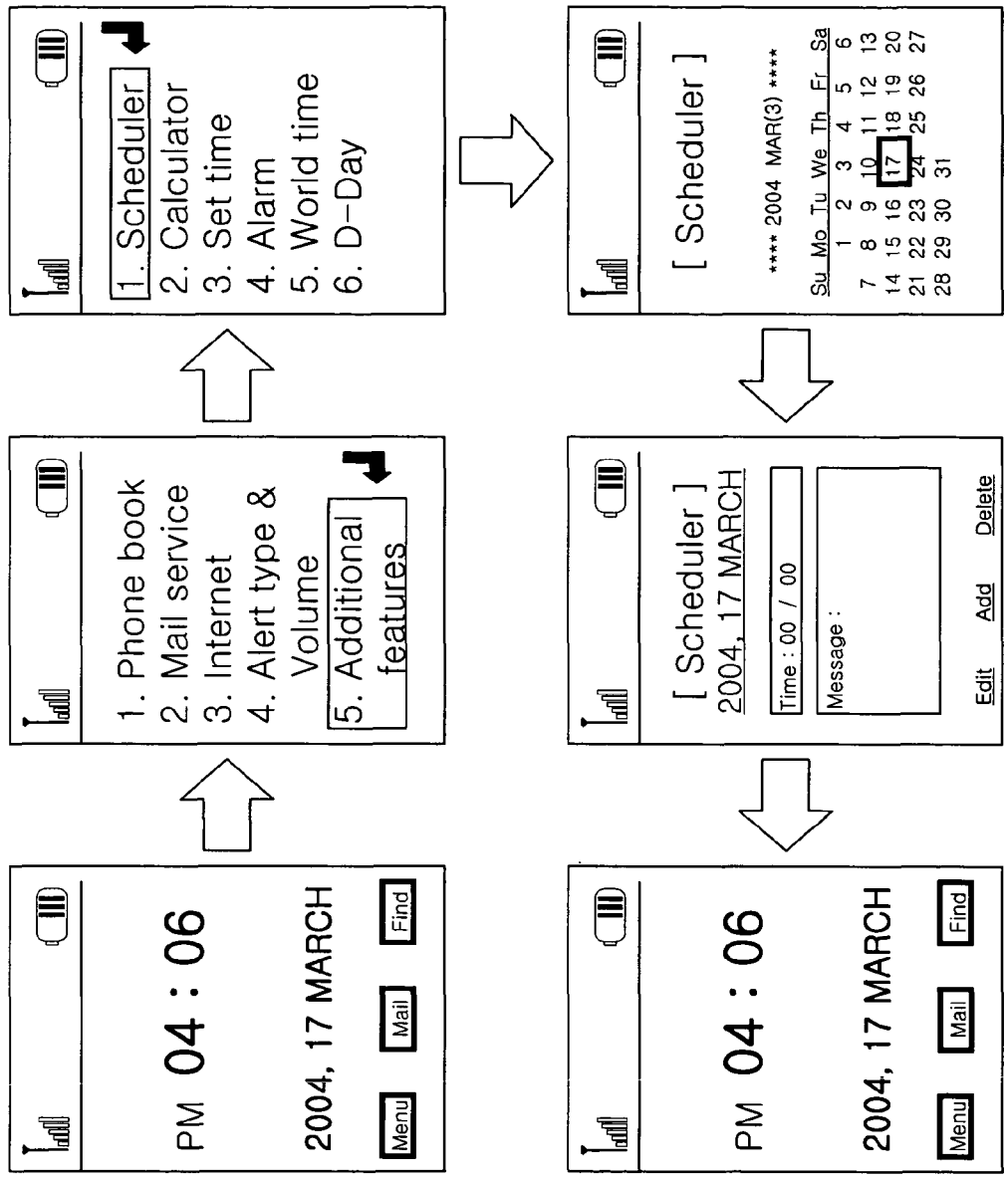
FIG. 1 is an exemplary view illustrating a method for managing a schedule in a mobile communication terminal, in accordance with the related art.
Figure 2:
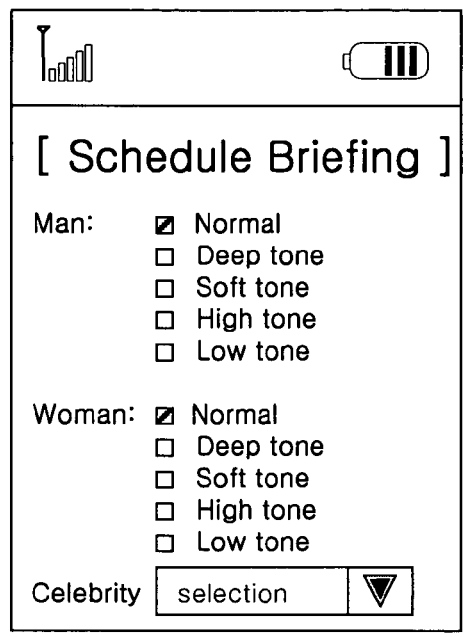
FIG. 2 is an exemplary view illustrating a voice selection menu in accordance with an embodiment of the present invention.
Figure 3:
FIG. 3 is an exemplary view illustrating a supplementary information service menu in accordance with an embodiment of the present invention.

FIGS. 2 and 3 illustrate exemplary views of menus regarding the schedule briefing method in accordance with an embodiment of the present invention. Specifically, FIG. 2 illustrates a voice select menu and FIG. 3 illustrates a supplementary information service menu.

With reference to FIG. 2, the mobile communication terminal is provided with various audible forms of communication, such as voices, wherein the user may select one or more voices to announce a schedule or a particular event. Preferably, the user can select a desired voice, such as a male or female voice or the voice of a celebrity, for example. Also, the user may preferably select from the voice select menu of FIG. 2 a voice tone, such as a low tone, a high tone, a deep tone, a soft tone, and the like. Alternatively, the user may select a default voice generated by the TTS, which should preferably be capable of annunciate all inputted text.

With reference to FIG. 3, the user of the mobile communication terminal may select a service from a supplementary service select menu installed in the terminal. The selected information service may be provided along with or in the absence of any scheduled events to be announced during the schedule briefing. The supplementary information service may comprise a weather forecast information service, a stock or market information service, a news information service, a traffic information service, a humor service or the like. The various supplementary information services are to be provided by a communication service provider, wherein the user selects specific contents of each service.

FIG. 4 illustrates a flow chart of a schedule briefing method in accordance with an embodiment of the present invention, wherein the method will be described with reference to FIGS. 2 to 4 as follows.

When the user requests a schedule briefing, such as when the user presses a preprogrammed smart key for a schedule briefing (step S10), the scheduler installed in the terminal searches whether there is a schedule for a corresponding date (step S20). The scheduler may search stored memory within the terminal or within a server which the terminal accesses. If there is no schedule, a corresponding voice announcement message (e.g., "no schedule, briefing is terminated") is outputted (step S60) and the briefing function is terminated (step S70). The voice announcement can be outputted through an earpiece or through a speakerphone installed in the terminal.

If, however, there is a stored schedule, the scheduler outputs a voice message informing of the number of events or schedules (e.g., "today there are five events") (step S40) and outputs a voice message for a content of each event of the schedule (step S50). Alternatively, the user may have two separate schedules to be announced, such as one for work (e.g., meetings, conference calls, etc.) and another for personal events (e.g., home service appointment, birthday, etc.).

The voice message for the content of the schedule may be divided into a portion where the same content is repeated (e.g., something is due at some time) and a portion where a content is changed whenever a briefing is made. The repeated portion is audibly outputted via speech while the non-repeated portion is handled by a mechanical voice or sound generated by the TTS function.

In the step (S50), if the voice message of the stored schedule is completely outputted, the scheduler outputs a voice message (e.g., "no further events or schedules" and "briefing is terminated"), which indicates that the briefing has been completed (step S60) and terminates the schedule briefing process (step S70).

It will be apparent to those skilled in the art that various modifications and variations can be made in the present invention without departing from the spirit or scope of the invention. Therefore, the foregoing description of these embodiments of the present invention has been presented for the purposes of illustration and description. It is not intended to be exhaustive or to limit the invention to the precise form disclosed. Thus, it is intended that the present invention cover the modifications and variations of this invention provided they come within the scope of the appended claims and their equivalents.

What is claimed is:

1. A method of providing a schedule briefing by a mobile communication terminal, the method comprising:
sensing, by the mobile communication terminal, user manipulation of a key of the mobile communication terminal; and
in response to sensing the user manipulation of the key:
determining whether at least one event is scheduled for a current date;
vocally outputting content of all events scheduled for the current date by a text to speech (TTS) function if it is determined that at least one event is scheduled for the current date,
wherein the content of each of all the events scheduled for the current date is vocally output one event after another without requesting user input further to the user manipulation of the key, if all the events total two or more in number; and
audibly announcing a termination of the schedule briefing after the content of all the events is output,
wherein the events comprise at least one event scheduled after a current time on the current date.

2. The method of claim 1, wherein sensing the manipulation of the key comprises sensing a manipulation of a smart key disposed on the mobile communication terminal, the smart key being specifically programmed to initiate the schedule briefing.

3. The method of claim 2, wherein the current time corresponds to a time when the smart key is manipulated to initiate the schedule briefing.

4. The method of claim 1, wherein the content is vocally output in the form of a voice selected from a group consisting of a male voice, a female voice, a mechanical voice, and a voice of one or more celebrities.

5. The method of claim 4, wherein a user selects a tone of the voice.

6. The method of claim 1, further comprising terminating the schedule briefing if it is determined that no event is scheduled for the current date.

7. The method of claim 1, further comprising audibly outputting supplementary information along with the output content, the supplementary information provided by a communication service provider and selected by a user.

8. The method of claim 7, wherein the supplementary information comprises at least weather forecast information, stock or market information, news information, or traffic information.

9. The method of claim 7, wherein the supplementary information is audibly output in a mechanical voice.

10. The method of claim 1, further comprising:
in response to sensing the manipulation of the key, audibly announcing a number of all the events scheduled for the current date.

11. The method of claim 1, further comprising:
audibly informing a user that no event is scheduled if it is determined that no event is scheduled for the current date.

12. A mobile communication terminal for providing a schedule briefing, the mobile communication terminal comprising:
means for sensing user manipulation of a key of the mobile communication terminal; and
means for responding to sensing the user manipulation of the key by:
determining whether at least one event is scheduled for a current date; and
audibly outputting content of all events scheduled for the current date if it is determined that at least one event is scheduled for the current date,
wherein the content of each of all the events scheduled for the current date is audibly output one event after another without requesting user input further to the user manipulation of the key, if all the events total two or more in number; and
audibly announcing a termination of the schedule briefing after the content of all the events is output,
wherein the events comprise at least one event scheduled after a current time on the current date.

13. The mobile communication terminal of claim 12, wherein the means for sensing the manipulation of the key senses manipulation of a smart key disposed on the mobile communication terminal, the smart key being specifically programmed to initiate the schedule briefing.

14. The mobile communication terminal of claim 13, wherein the current time corresponds to a time when the smart key is manipulated to initiate the schedule briefing.

15. The mobile communication terminal of claim 12, wherein the content is vocally output by a text to speech (TTS) function.

16. The mobile communication terminal of claim 12, further comprising:
means for audibly announcing a number of all the events scheduled for the current date.

17. The mobile communication terminal of claim 12, further comprising:
means for audibly informing a user that no event is scheduled if it is determined that no event is scheduled for the current date.

* * * * *